April 9, 1957 R. A. ROAD ET AL 2,788,472
METERS AND CONNECTION FACILITIES THEREFOR
Filed Jan. 19, 1953 2 Sheets-Sheet 2

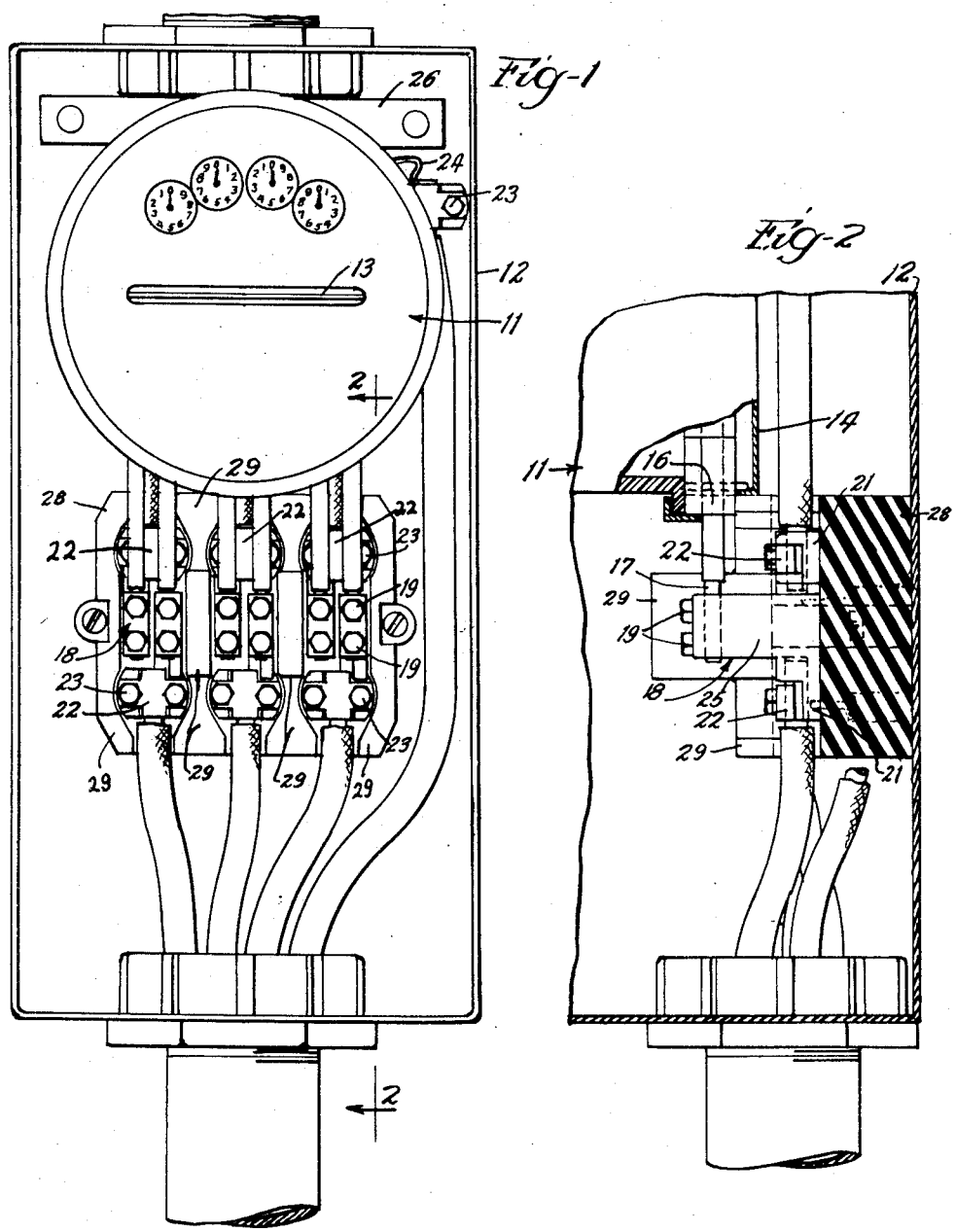

United States Patent Office 2,788,472
Patented Apr. 9, 1957

2,788,472
METERS AND CONNECTION FACILITIES THEREFOR

Richard A. Road and Orville K. Coleman, West Lafayette, Ind., assignors, by mesne assignments, to Duncan Electric Company, Inc., Lafayette, Ind., a corporation of Indiana Application January 19, 1953, Serial No. 331,918

8 Claims. (Cl. 317—107)

In the field of watthour meters, two types of meter mountings have long been common. One is the ancient bottom-connected meter in which the meter would be mounted on a wall in or above a wiring box, the wires or intermediate connectors being extended into a terminal chamber forming a downward extension from the meter base. The other of these common types is the socket meter in which the meter is carried by a base plate and has four connecting blades extending through the base plate so that this whole assembly can be plugged into a socket. The socket was a pan-like base having therein connecting clamps to receive the connecting blades. In the more common type of socket these clamps were of a spring-jaw type. In an application co-pending herewith, Serial No. 119,074 (Patent No. 2,626,309, to issue January 20, 1953), this socket was replaced by superior connection facilities which enabled the meter to withstand heavier current loads than was possible with the prior socket. This development has been very favorably received commercially and has now been widely known for some years.

In spite of the obvious advantages of these socket or back-bladed meters, there have been objections to them which have prevented them from being more widely adopted and have even led some power-selling organizations to insist on the bottom-connected meters.

One advantage of the bottom-connected meters has been the complete and easy accessibility of its connections, even while the meter was in place. This facilitated the use of preferred screw-type connections exclusively, and had other advantages.

Manufacturers have long wanted to improve the bottom-connected meters. Not only did they notably lack some advantages of the socket meters, but also they were enough more expensive to make so that the profit margin was smaller—and even fewer of them would have been sold had the price been raised to afford the same margin of profit.

The present invention provides the long-sought improvement and to a large extent combines the advantages of the bottom-connected meter with the advantages of the socket meter, including a lower cost than the former. At the same time, the invention lends itself to providing a high load-carrying capacity corresponding to that provided for socket meters by the co-pending application above mentioned.

In some respects, the result is beyond the combined advantages of all of the others. For example, seven connections into the meter can be provided without excessive crowding.

Additional objects and advantages of the invention will be apparent from the following description and the drawings.

Designation of figures

Fig. 1 is a front view of one form of the invention chosen for illustration, the box cover being removed.

Fig. 2 is a view representing, perhaps somewhat inexactly, a vertical sectional view through the structure of Fig. 1.

Figure 4:
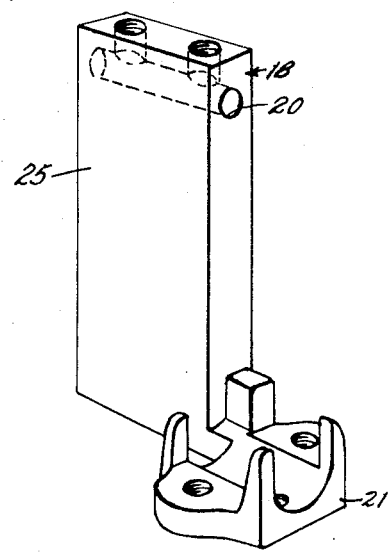
Fig. 4 is a perspective view of a connector in Fig. 1.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

General description

In the forms of the invention chosen for illustration, the meter assembly 11 is mounted on and projects forwardly from a box 12. The cover of box 12, not shown, has an aperture through which the glass cover of meter 11 extends. The box 12 is a simple sheet metal box of a type already commonly provided for heavy-duty installations.

The meter mechanism is mounted on a simple shallow base pan 14, to which also the glass cover is secured. The current coils forming part of the meter mechanism 13 are extended directly through insulation 16 along the bottom of base pan 14 to provide connecting prongs or blades 17. By "extending directly" is meant that metal which is either integral with the current coils or secured thereto permanently, as by brazing, extends through the wall of the pan in a simple manner, namely, without any intermediate connections. The connecting prongs 17 extend into socket clamps 18 and are disposed in parallel relationship therein so that when the screws 19 are loosened, the meter assembly may be raised and easily disconnected and slipped out of the box for service, testing or replacement.

The preferred form of the socket clamp 18 is seen best in Fig. 4. Each of the socket clamps 18 extends integrally through a heavy cross-section from its conductor-receiving socket 20 to a base plate 21 of a saddle clamp for the service connections. After the service conductors have been laid in place, the saddle clamp plates 22 may be applied over them and tightened with screws 23. With the illustrated arrangement, it is contemplated that one set of service conductors, either the power-supply conductors or the load conductors, will be connected to the bottom set of saddle clamps 21, 22, while the other set of service conductors will be connected to the upper set of saddle clamps 21, 22, as seen best in Figure 2. The relative positioning of leg or post 25 off-center or to one side of the axis of the saddle clamp of the base plate 21 permits two identical clamps to be paired, as in Fig. 1, with the plates 21 in alignment. In some instances a fourth conductor will be involved in the power supply and will be connected, as shown, to a saddle clamp 23 to which a voltage connection 24 may extend. The saddle clamp 23 may be a double clamp, one to the left of the one visible in Fig. 1, the base of the two clamps being integral and the entire being insulated from the box. In this way the power supply and load conductors may be connected together and by the light voltage connection 24 may be connected to the meter.

Further details

The meter assembly may be supported in the box 12 in any suitable manner. For example, a bracket 26 may be secured to the box in a position to straddle the cables and provided at its front with a button over which a suitable inverted keyhole shaped slot may be hooked as the connecting prongs are lowered into the socket clamps 18.

The socket clamps 18 and their associated parts are each mounted on a terminal block 28, of insulating material, which in turn is secured to the back wall of the box 12. The block 28 and the clamp therein may be called the terminal block or the terminal block assembly.

Preferably the meter is so designed that the block may be arranged generally as illustrated in Fig. 1. Here the socket clamps 18 are arranged in pairs, each pair including one socket clamp and associated saddle clamp for a power-supply cable and one for a load cable. Only slight spacing between these two connectors of one pair is necessary, inasmuch as the only voltage difference between them is the very slight voltage drop across them to the current coil to which both are connected. This compact arrangement permits very good insulation between the successive pairs, even when there are three pairs. Thus, the terminal block 28 includes integral segregating walls 29 of substantial thickness and height.

There are several advantages of having one set of clamps for the conductor cables facing downwardly and the other facing upwardly as illustrated. One advantage is that even if there are six conductors involved, there is plenty of room for these saddle clamps and the insulation between them, inasmuch as there will be only three to a side. Another advantage is that with the more common arrangement of heavy-duty cables, one set entering from the top and the other from the bottom of the box, the cables can be laid into the saddle clamps with a minimum of bending. A third advantage is that there will be no danger of confusing electricians who in America are accustomed to a different distribution of the power supply and load conductors. The American practice has been to put one set of these at the left and the other at the right. If four or six clamps for receiving the service conductors were arranged in one line, there would be a tendency for electricians to follow this arrangement by habit. The illustrated disposition of the saddle clamps is so obviously unsuitable to such an arrangement that there is no danger of this mistake.

The apertures 20 of socket clamps 18 are preferably located high enough forwardly from the saddle clamps 21, 22, so that there will be room for the heavy cables to pass under the base pan 14 without excessive bending or crowding.

Preferably there are two screws in the heavy-duty socket clamps 18, as illustrated in Fig. 1. This is desirable in part because of the heavy load which is carried and the lowering of contact resistance when there are two tightly engaging screws instead of one. Another important advantage, however, is in connection with applying bridging plates.

If a meter is to be removed for any reason while service is continued, this can be done by loosening the six bottom screws 19 and inserting three bridging conductors, one under each pair. The screws are then tightened on the bridging conductors, thereby completing the circuits through them. Then the six upper screws can be loosened and the meter removed without interrupting the service. Usually the removal of the meter is only for testing or replacement by another. The bridging conductors which are used for such temporary purposes preferably have insulating handles which will extend far enough forwardly to block the closing of the cover of box 12, thus preventing the accidental leaving of a bridge conductor in place.

Figure 3:
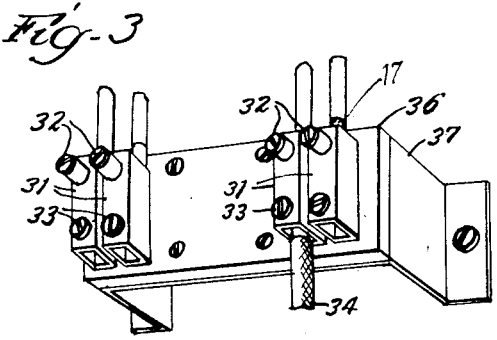
Fig. 3 is a fragmentary perspective view showing a modified form of terminal block which can be used for ordinary duty, especially when heavy-duty requirements are expected later.

The terminal block 28 is only necessary for heavy-duty installations. For more ordinary service, the simpler connecting facilities illustrated in Fig. 3 may be used. Here each connector 31 comprises a simple square tube with screws 32 and 33 near the opposite ends thereof. The upper screws 32 tighten on the connecting prods of the meter. The connectors 31 extend far enough downwardly so that ordinary conductors represented by the wire 34 may be inserted into them and tightened by lower screws 33. It will be observed that in this instance the arrangement does not lend itself so well to preventing mistake as in the Fig. 1 form and accordingly very clear labeling of the power supply and load conductors should be provided. The connectors 31 are mounted on an insulating plate 36 which in turn is mounted on a bracket 37 carried by the back of the box. Of course, where only ordinary loads are contemplated, smaller boxes, perhaps with the meters mainly outside of them, may be worked out. The arrangement illustrated in Fig. 3 is especially suitable when the ultimate provision of heavy-duty service is expected. It may also be noted that the connectors 31 need not be of sufficient size to accommodate the heavy-duty meters. It is desirable, however, that the meters for ordinary duty be adapted to fit both the heavy-duty terminal block of Fig. 1 and the ordinary duty terminal block of Fig. 3. Thus, when the heavy-duty connection facilities have been installed but are not yet required, the ordinary meter may continue to be used.

In the heavy duty meter the connecting prongs and the conductors leading to them from the current coils are copper of heavy enough cross-section to help position the meter and to draw heat from the meter. The firm pressure of the socket or prong receiving clamps 18 and the cross-section thereof, which is quite heavy to the saddle clamps aids in the heat withdrawal.

We claim:

1. A watthour meter having current coils, and connection facilities therefor including a box, a meter case having its back portion in the box, a terminal block in said box, a plurality of connectors carried by said block and each having a saddle clamp and, well forward thereof and integrally connected to a part thereof by a bar of heavy cross-section a socket clamp, one-piece conductors extending directly from said current coils through said case and terminating as parallel connection prongs all pointed downwardly and extending into said socket clamps, said meter being readily removable if said socket clamps are loosened.

2. Connection facilities for watthour meters including a terminal block assembly comprising a body of insulating material having outstanding insulating walls, and a plurality of connectors carried thereby and arranged in pairs with the pairs separated by said walls, the connectors each comprising a saddle clamp, and a leg standing outwardly from the base of the saddle clamp and forming at least part of an upwardly opening socket clamp, one of said saddle clamps of each pair having its opening facing upwardly above the body and the other having its opening facing downwardly below the body.

3. Connection facilities for watthour meters including a box, a bracket in said box and a plurality of vertically disposed tubular connectors insulatively supported on said bracket, having outwardly exposed screws therein near each end, and being long enough to receive a meter connecting prong in one end and under the screw at that end and a service conductor in the other end and under the screw at that end, and spaced from the back of the box sufficiently to leave room for heavy-duty service cables to pass beneath a meter aligned with said connectors.

4. Connection facilities for watthour meters including a terminal block assembly comprising a body of insulating material and a plurality of connectors carried thereby, the connectors each comprising a service-conductor clamp, and a leg standing outwardly from the clamp and forming at least part of an upwardly opening prong-receiving clamp, one of said service-conductor clamps of each pair having its opening facing upwardly above the body and the other having its opening facing downwardly below the body.

5. Connection facilities for watthour meters including a terminal block assembly comprising a body of insulating material and a plurality of connectors carried thereby, the connectors each comprising a service-conductor clamp, and a leg standing outwardly from the clamp and forming at least part of an upwardly opening prong-receiving clamp, one of said service-conductor clamps of each pair having its opening facing upwardly above the body and the other having its opening facing downwardly below the body; the tops of the legs lying in a common plane to receive bridging plates under screws in the legs.

6. Connection facilities for watthour meters including a terminal block assembly comprising a body of insulating material having outstanding insulating walls, and a plurality of connectors carried thereby and arranged in pairs with the pairs separated by said walls, the connectors each comprising a saddle clamp, and a leg standing outwardly from the base of the saddle clamp and forming at least part of an upwardly opening socket clamp, one of said saddle clamps of each pair being positioned above the leg and having its opening facing upwardly above the body and the other being positioned below the leg and having its opening facing downwardly below the body; the two connectors of each pair being identical, with the leg of each offset from the axis of its saddle clamp to provide a space for receiving the leg of the other clamp of the pair.

7. Connection facilities in accordance with claim 5 in which two screws, one above the other, are screwed through the outer faces of each leg at the top of the leg, the upper for clamping the prong and the lower for receiving a bridging plate and, when the bridging plate is not present, for additionally clamping the prong.

8. Connection facilities in accordance with claim 4 in which the service-conductor clamp is laterally offset with respect to the center line of the leg associated with it, and is of a type adapted to surround the conductor clamped in it.

References Cited in the file of this patent
UNITED STATES PATENTS

| | | |
|---|---|---|
| Re. 20,780 | Hagist | July 5, 1938 |
| 582,464 | Dusenbury | May 11, 1897 |
| 1,266,441 | Finkelstein | May 14, 1918 |
| 1,642,345 | Telford | Sept. 13, 1927 |
| 1,985,048 | McIlvaine | Dec. 18, 1934 |
| 2,511,995 | Robertson | June 20, 1950 |
| 2,642,483 | Wey | June 16, 1953 |

FOREIGN PATENTS

| | | |
|---|---|---|
| 422,716 | Great Britain | Jan. 17, 1935 |